(12) United States Patent
Wilson et al.

(10) Patent No.: US 10,228,069 B2
(45) Date of Patent: Mar. 12, 2019

(54) RUPTURE DISC DEVICE AND METHOD OF ASSEMBLY THEREOF (71) Applicant: Oklahoma Safety Equipment Company, Inc., Broken Arrow, OK (US)

(72) Inventors: Alan T. Wilson, Tulsa, OK (US); Hunter Franks, Tulsa, OK (US); Brandon Hentzen, Skiatook, OK (US); Michael Kmitta, Owasso, OK (US); Mark Randall Blackmon, Broken Arrow, OK (US); Robert Evans, Jenks, OK (US)

(73) Assignee: Oklahoma Safety Equipment Company, Inc., Broken Arrow, OK (US)

( * ) Notice: Subject to any disclaimer, the term of this patent is extended or adjusted under 35 U.S.C. 154(b) by 58 days.

(21) Appl. No.: 15/344,314

(22) Filed: Nov. 4, 2016

(65) Prior Publication Data
US 2017/0130853 A1 May 11, 2017

Related U.S. Application Data (60) Provisional application No. 62/252,176, filed on Nov. 6, 2015, provisional application No. 62/281,016, filed on Jan. 20, 2016.

(51) Int. Cl.
*F16K 17/40* (2006.01)
*B23K 9/028* (2006.01)
(Continued)

(52) U.S. Cl.
CPC ............... *F16K 17/40* (2013.01); *B23K 9/028* (2013.01); *B23K 15/0006* (2013.01); *F16K 17/1613* (2013.01)

(58) Field of Classification Search
CPC ................................ F16K 17/40; B23K 9/028
(Continued)

(56) References Cited

U.S. PATENT DOCUMENTS

| | | |
|---|---|---|
| 1,947,309 A | 2/1934 | Rowley |
| 2,474,826 A | 7/1949 | Cantlin |

(Continued)

FOREIGN PATENT DOCUMENTS

| | | |
|---|---|---|
| CN | 1347486 A | 5/2002 |
| CN | 1623029 A | 6/2005 |

(Continued)

OTHER PUBLICATIONS

Fike, Chemical, Explosion Protection Systems, Pressure Relief/Bursting Discs, Fire Protection Systems, retrieved on Jun. 29, 2016; http://www.fike.be/chemical.php; 2 pages.

(Continued)

*Primary Examiner* — Minh Le
(74) *Attorney, Agent, or Firm* — Fitch, Even, Tabin & Flannery LLP (57) ABSTRACT A rupture disc device and method of assembly thereof are provided. The rupture disc device has a device body formed so that there are no leakage pathways to the radially outer surface thereof. The rupture disc is welded to the device body so that the weld joint therebetween is not relied upon to provide structural support, and instead strictly acts as a seal. In one form, the weld joint is formed with the weld beam directed axially transverse to thickness of the rupture disc to minimize unwanted variances in the rupture disc burst pressure that otherwise may be created due to the heat generated during weld joint formation.

25 Claims, 8 Drawing Sheets (51) Int. Cl.
  *B23K 15/00* (2006.01)
  *F16K 17/16* (2006.01)
(58) Field of Classification Search
  USPC .......... 137/68.25, 68.19, 68.23, 68.24, 68.26
  See application file for complete search history.

(56) References Cited

U.S. PATENT DOCUMENTS

| | | |
|---|---|---|
| 2,576,431 A | 11/1951 | White |
| 2,701,075 A | 2/1955 | Coffman |
| 2,716,506 A | 8/1955 | Fike |
| 2,758,749 A | 8/1956 | Jones |
| 2,766,904 A | 10/1956 | Philip |
| 2,856,096 A | 10/1958 | Philip |
| 2,910,082 A | 10/1959 | Ferguson |
| 2,947,443 A | 8/1960 | Sawyer |
| 2,987,218 A | 6/1961 | Erickson |
| 3,108,636 A | 10/1963 | Peterson |
| 3,261,404 A | 7/1966 | Merdinyan |
| 3,467,120 A | 9/1969 | Hill |
| 3,474,809 A | 10/1969 | Gordon |
| 3,478,761 A | 11/1969 | Fox |
| 3,484,817 A | 12/1969 | Wood |
| 3,520,443 A | 7/1970 | Selby, Jr. |
| 3,583,479 A | 6/1971 | Taylor |
| 3,599,713 A | 8/1971 | Jenkins |
| 3,612,345 A | 10/1971 | Fike, Jr. |
| 3,647,109 A | 3/1972 | Hebblethwaite |
| 3,815,779 A | 6/1974 | Ludwig |
| 3,831,680 A | 8/1974 | Edwards |
| 3,901,259 A | 8/1975 | Banbury |
| 3,906,977 A | 9/1975 | Summers |
| 3,908,684 A | 9/1975 | Short |
| 4,073,402 A | 2/1978 | Wood |
| 4,085,764 A | 4/1978 | Raidl, Jr. |
| 4,102,167 A | 7/1978 | Wood |
| 4,126,184 A | 11/1978 | Hinrichs |
| 4,195,745 A | 4/1980 | Lavering |
| 4,203,616 A | 5/1980 | Okada |
| 4,257,528 A | 3/1981 | Brodie |
| 4,278,181 A | 7/1981 | Wood et al. |
| 4,289,327 A | 9/1981 | Okada |
| 4,342,988 A | 8/1982 | Thompson |
| 4,363,418 A | 12/1982 | Matz |
| 4,372,334 A | 2/1983 | Paul, Jr. |
| 4,403,626 A | 9/1983 | Paul, Jr. |
| 4,404,982 A | 9/1983 | Ou |
| 4,431,018 A | 2/1984 | Finnegan |
| 4,434,905 A | 3/1984 | Ou |
| 4,444,214 A | 4/1984 | Paul, Jr. |
| 4,463,865 A | 8/1984 | Mundt |
| 4,464,936 A | 8/1984 | McIntire |
| 4,505,180 A | 3/1985 | Hinrichs |
| 4,512,171 A | 4/1985 | Mozley |
| 4,553,559 A | 11/1985 | Short, III |
| 4,561,630 A | 12/1985 | McCulloch |
| 4,597,505 A | 7/1986 | Mozley |
| 4,669,626 A | 6/1987 | Mozley |
| 4,682,619 A | 7/1987 | Clift |
| 4,721,158 A | 1/1988 | Merritt, Jr. |
| 4,751,938 A | 6/1988 | Kerns |
| 4,759,460 A | 7/1988 | Mozley |
| 4,796,704 A | 1/1989 | Forrest |
| 4,809,729 A | 3/1989 | Muddiman |
| 5,002,085 A | 3/1991 | Fitzgerald |
| 5,005,722 A | 4/1991 | Short, III |
| 5,012,945 A | 5/1991 | Keenan |
| 5,036,632 A | 8/1991 | Short, III |
| 5,050,630 A | 9/1991 | Farwell |
| 5,058,413 A | 10/1991 | Muddiman |
| 5,155,471 A | 10/1992 | Ellis |
| RE34,308 E | 7/1993 | Thompson |
| 5,337,776 A | 8/1994 | Perry |
| 5,388,646 A | 2/1995 | Hensley |
| 5,411,098 A | 5/1995 | Schmidt |
| 5,531,363 A | 7/1996 | Gross et al. |
| 5,617,921 A | 4/1997 | Schmidt |
| 5,761,261 A | 6/1998 | Karrh et al. |
| 5,878,770 A | 3/1999 | Fujita |
| 5,947,143 A | 9/1999 | Moakes et al. |
| 5,954,135 A | 9/1999 | Williamson et al. |
| 6,006,842 A | 12/1999 | Stilwell |
| 6,065,485 A | 5/2000 | Rooker |
| 6,070,365 A | 6/2000 | Leonard |
| 6,178,983 B1 | 1/2001 | Cullianne |
| 6,230,733 B1 | 5/2001 | Strelow |
| 6,240,948 B1 | 6/2001 | Hansen, III |
| 6,298,869 B1 | 10/2001 | Strelow |
| 6,318,576 B1 | 11/2001 | Graham |
| 6,321,582 B1 | 11/2001 | Cullianne |
| 6,367,203 B1 | 4/2002 | Graham |
| 6,378,544 B1 | 4/2002 | Dibello |
| 6,434,276 B2 | 8/2002 | Hirosawa et al. |
| 6,446,653 B2 | 9/2002 | Cullinane |
| 6,490,132 B2 | 12/2002 | Kano et al. |
| 6,494,074 B2 | 12/2002 | Cullinane |
| 6,534,097 B1 | 3/2003 | Baggott |
| 6,604,541 B1 | 8/2003 | Denning |
| 6,672,389 B1 | 1/2004 | Hinrichs |
| 6,726,241 B2 | 4/2004 | Welz |
| 6,935,424 B2 | 8/2005 | Lehman |
| 6,955,182 B2 | 10/2005 | Siimes |
| 7,017,767 B2 | 3/2006 | Eijkelenberg |
| 7,168,333 B2 | 1/2007 | Brazier |
| 7,237,698 B2 | 7/2007 | Jackman |
| 7,281,544 B2 | 10/2007 | Bocquart |
| 7,395,868 B2 | 7/2008 | Sundholm et al. |
| 7,543,653 B2 | 6/2009 | Reilly et al. |
| 7,640,988 B2 | 1/2010 | Phi |
| 7,661,480 B2 | 2/2010 | Al-Anazi |
| 7,673,695 B2 | 3/2010 | Deurloo |
| 7,703,471 B2 | 4/2010 | Edwards |
| 7,735,671 B2 | 6/2010 | Eijkelenberg |
| 7,784,482 B2 | 8/2010 | Farwell |
| 7,878,215 B2 | 2/2011 | McLelland et al. |
| 8,038,024 B2 | 10/2011 | Krebill |
| 8,051,915 B2 | 11/2011 | Blease et al. |
| 8,091,574 B2 | 1/2012 | Melrose |
| 8,141,572 B2 | 3/2012 | Stenmark et al. |
| 8,181,663 B2 | 5/2012 | Walker |
| 8,322,360 B2 | 12/2012 | Wilson |
| 8,354,934 B2 | 1/2013 | Walker |
| 8,393,347 B2 | 3/2013 | Walker |
| 8,517,042 B2 | 8/2013 | Khamitkar |
| 8,534,308 B2 | 9/2013 | Nunez |
| 8,550,104 B2 | 10/2013 | Nunez |
| 8,622,071 B2 | 1/2014 | Wilson |
| 8,726,588 B2 | 5/2014 | Jakus |
| 8,733,383 B1 | 5/2014 | Wilson |
| 8,863,833 B2 | 10/2014 | Mescall |
| 9,121,517 B2 | 9/2015 | Kim |
| 9,261,200 B2 | 2/2016 | Smith et al. |
| 9,302,133 B2 | 4/2016 | Kluz et al. |
| 9,333,380 B2 | 5/2016 | Ehlers et al. |
| 9,365,183 B2 | 6/2016 | Johanson |
| 9,381,389 B2 | 7/2016 | Chattaway et al. |
| 9,470,326 B2 | 10/2016 | Goodyear |
| 9,562,611 B2 | 2/2017 | Languedoc et al. |
| 9,677,391 B2 | 6/2017 | Banks |
| 2003/0019277 A1 | 1/2003 | Brazier |
| 2005/0103786 A1 | 5/2005 | Eijkelenberg |
| 2006/0196539 A1 | 9/2006 | Raska |
| 2007/0181183 A1 | 8/2007 | Farwell |
| 2007/0234655 A1 | 10/2007 | Jakus |
| 2007/0283772 A1 | 12/2007 | Brazier |
| 2008/0053527 A1 | 3/2008 | Rutter |
| 2008/0128144 A1 | 6/2008 | Blease et al. |
| 2009/0000406 A1 | 1/2009 | Brazier |
| 2009/0173393 A1 | 7/2009 | Grabert |
| 2009/0173491 A1 | 7/2009 | O'Brien |
| 2010/0154894 A1 | 6/2010 | Kotapish |
| 2010/0206570 A1 | 8/2010 | Ocampos |
| 2010/0243072 A1 | 9/2010 | McGraw |
| 2011/0000676 A1 | 1/2011 | Brandsdal |

(56) References Cited

U.S. PATENT DOCUMENTS

| | | |
|---|---|---|
| 2012/0248108 A1 | 10/2012 | Goodyear |
| 2013/0126152 A1 | 5/2013 | Banks |
| 2014/0151065 A1 | 6/2014 | Stephenson |
| 2015/0211647 A1 | 7/2015 | Tomasko |
| 2016/0069474 A1 | 3/2016 | Shaw |
| 2016/0102773 A1 | 4/2016 | Smith |
| 2016/0184620 A1 | 6/2016 | Kluz et al. |
| 2016/0279452 A1 | 9/2016 | Chattaway et al. |
| 2017/0307095 A1 | 10/2017 | Wilson |

FOREIGN PATENT DOCUMENTS

| | | |
|---|---|---|
| CN | 201273266 Y | 7/2009 |
| DE | 29803116 | 5/1998 |
| EP | 0773393 A2 | 5/1997 |
| FR | 2270501 A1 | 12/1975 |
| GB | 895254 | 5/1962 |
| GB | 1310978 | 3/1973 |
| WO | 2007112147 | 10/2007 |
| WO | 2012135698 | 10/2012 |
| WO | 2013070805 | 5/2013 |
| WO | 2017079648 | 5/2017 |
| WO | 2017185099 | 10/2017 |

OTHER PUBLICATIONS

Notification of Transmittal of the International Search Report and the Written Opinion of the International Searching Authority, or the eclaration from the International Bureau of WIPO for corresponding International Application No. PCT/US16/60667, dated Feb. 7, 2016, 15 pages.
Invitation to Pay Additional Fees and, Where Applicable, Protest Fee from the International Bureau of WIPO for related International Application No. PCT/US17/29209, dated Jul. 26, 2017, 4 pages.
PCT; PCT App. No. PCT/US 17/29209; International Search Report and Written Opinion dated Sep. 13, 2017.
U.S. Appl. No. 15/620,386, filed Jun. 12, 2017, Banks David Wayne.
U.S. Appl. No. 15/836,646, filed Dec. 8, 2017, Meitzner Michael.
U.S. Appl. No. 62/431,985, filed Dec. 9, 2016, Meitzner Michael.
Description of "Hygienic Opti-Gard™ (OPH)," publicly available Jun. 2013, retrieved on Jun. 20, 2018; http://www.elfab.com/wp-content/uploads/2013/06/Hygienic-Opti-Gard.Description.pdf; 1 page.
Schematic for "Hygienic Opti-Gard™ (OPH)," publically available Jun. 2013, retrieved on Jun. 20, 2018; http://www.elfab.com/wp-content/uploads/2013/06/Hygienic-Opti-Gard-Schematic2.pdf; 1 page.
Engineering drawing of sanitary rupture disc device on sale Mar. 2010, 1 page.
Fluid End Parts List for "Well Servicing Pump" Model OPI-600, Triplex Pump, issued by Gardner Denver®, Apr. 2007 (3 pages).

PRIOR ART

FIG.10

RUPTURE DISC DEVICE AND METHOD OF ASSEMBLY THEREOF

CROSS-REFERENCE TO RELATED APPLICATIONS

This application claims the benefit of U.S. Application Ser. No. 62/252,176, filed Nov. 6, 2015 and U.S. Application Ser. No. 62/281,016, filed Jan. 20, 2016, both of which are incorporated by reference herein in their entireties.

FIELD OF THE INVENTION

The present invention relates to a rupture disc device and its assembly and, more particularly, to a sealed rupture disc device and a welding method therefor.

BACKGROUND OF THE INVENTION

Rupture discs are used in a variety of chemical process and manufacturing applications. In these applications, hazardous, caustic and corrosive media may be used or produced. For these systems, rupture disc assemblies that include a multi-piece holder are known where the rupture disc is held in place under the tension of a bolted flange. However, when exposed to harsh media, corrosion and disruption of the disc can cause unwanted leakage between the disc and the holder. In another approach, rupture disc assemblies have used a two-piece holder where the rupture disc is sandwiched between the two holder pieces and welded into place around the outer peripheries of the holder pieces and the rupture disc so that it is welded therebetween.

SUMMARY OF THE INVENTION

In one aspect, it has been found that the peripheral edge joint weld of the two-piece holder rupture disc assembly can create an undesired variance in the burst pressures of the rupture discs due to the radially directed energy along the rupture disc that is generated during the welding process. Moreover, since the weld is exposed on the outer peripheral surface of the rupture disc assembly, any defects in the weld can create leakage issues.

Accordingly, the rupture disc device herein has a device body with a solid outer surface such that there are no potential leakage paths to the radial outer periphery of the device. To this end, the welds between the disc and the device body and the components of the device body are radially inward from the radially outer surface of the device body. In a preferred form, the rupture disc has its frangible dome wall portion disposed in a linear throughbore of the device body in a reverse-acting orientation so that the convex side of the dome wall portion of the disc is oriented toward the inlet of the device body. In this manner, the pressure of the process media generates compressive forces in the radially inward weld joint which contributes to the sealing effect achieved thereby. This also allows the weld joint between the rupture disc and the device body to be less robust while still achieving a proper seal therebetween.

In another aspect, the rupture disc device herein is welded so as to be able to achieve consistency in the desired burst pressures thereof. For this, the rupture disc is welded in a direction transverse to the wall thickness thereof and, more preferably, in an axial direction. In this manner, the heat generated during the welding process is not directed along the rupture disc in a radial inward direction toward the central dome portion thereof. Depending on the metallurgical properties of rupture disc, such radially directed heat can create unwanted variances in the desired burst pressures of the rupture disc. With the axially directed welding process herein, such unwanted variances are minimized. Furthermore, because of the previously described ability to create less robust or lower strength weld joints with the reverse-acting arrangement of the preferred rupture disc device herein, this further contributes to the lowering of the heat energy needed during the welding process which, in turn, contributes to maintaining desired burst pressures of the rupture disc.

This problem of creating unwanted variances in the desired burst pressures due to radially directed heat along the rupture disc such as generated when creating the weld joint at the outer periphery of the device body is particularly problematic with rupture discs that have low burst pressure requirements. In the past, it was possible to weld the thicker materials required for high pressure applications via a circumferential butt/groove weld without materially affecting the burst pressures. However, to achieve the full range of pressures including low burst pressure requirements, thinner rupture disc material is required which is more likely to be affected with radially directed welding such as used for generating the peripheral edge joint weld in the prior rupture disc assembly. Thus, the present rupture disc device including the method for generating the weld joints thereof is particularly well suited for rupture discs having thinner wall thicknesses such as in the range of approximately 0.001 inches to approximately 0.037 inches for use in low burst pressure applications.

In another form, a rupture disc device is provided having a similar device body with a solid outer surface. In both forms of the rupture disc device herein, the device body can have a two-piece construction including a smaller diameter annular retaining ring member and a larger diameter annular main device body seat member which are welded together to form a central, linear throughbore extending through the device body. In the initially described form, the rupture disc is welded to the seat member with the welding performed as previously described. The retaining ring member is then fit in a recessed seating area of the seat member to be welded thereto.

However, with the solid outer surface of the device body it has also been found that it can be advantageous to weld the rupture disc to the smaller diameter retaining ring member in the alternative form of the rupture disc device. Because the configurations of the retaining ring member and the rupture disc allow for tighter welding fixture clamping, a peripheral edge joint type weld can be formed between the outer peripheries of the retaining ring member of the rupture disc without creating issues with variances in the burst pressure of the rupture disc. The reason is that the radially directed heat energy generated during the welding process need not be as great for forming the weld because of the tighter fixturing for the retaining ring member and the rupture disc during the welding process while at the same time forming the weld so that it is sufficient to form a seal between the retaining ring member and the rupture disc.

DETAILED DESCRIPTION OF THE PREFERRED EMBODIMENTS

Figure 1:
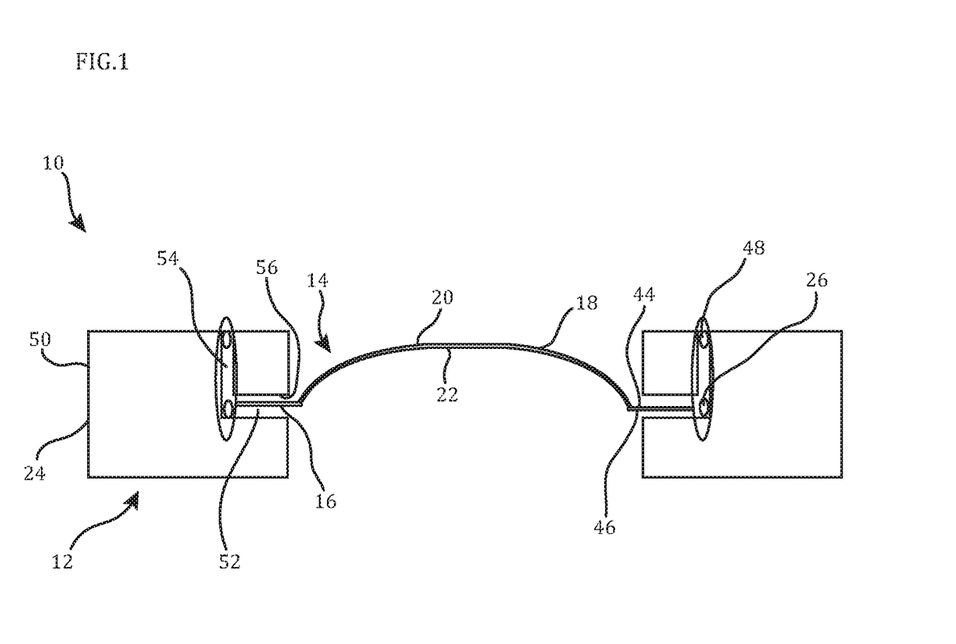
FIG. 1 is a schematic view of the rupture disc device showing a rupture disc welded to a device body.

FIG. 1 shows a rupture disc device 10 having a device body 12 and a rupture disc 14 secured thereto. The rupture disc 14 has a flat, outer ring portion 16 and a central, frangible dome wall portion 18 at the radial center of the rupture disc 14. The central dome wall portion 18 of the rupture disc 14 has a convex surface 20 and a concave surface 22 which can have a constant thickness therebetween. The frangible dome wall portion 18 is configured to rupture at a predetermined burst pressure depending on several factors relating to its configuration including the thickness of the dome wall portion 18 and the amount, type and configuration of any scoring provided in either or both of the convex and concave surfaces 20, 22 thereof.

Figure 10:
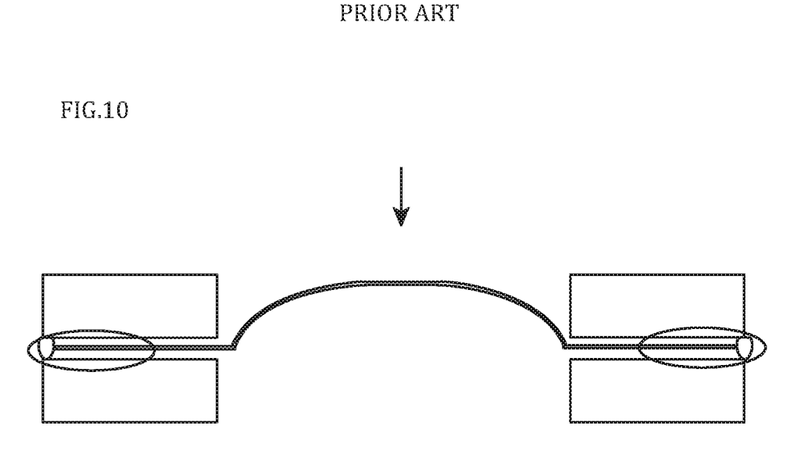
FIG. 10 is a schematic view of a prior art rupture disc assembly showing a two-piece device body and rupture disc sealed at an outer peripheral weld joint therebetween.

As can be seen, the device body 12 has a radially outer surface 24 and the rupture disc 14 is secured to the device body 12 via a weld joint 26 that is spaced radially inward from the body outer surface 24 so as not to be exposed thereat. By contrast and referencing FIG. 10, the prior rupture disc assembly had a two-piece device body and a rupture disc sandwiched therebetween with a weld joint formed at the outer peripheral surface of the device body. Thus, when used in a reverse-acting configuration where the convex surface of the central dome portion of the rupture disc is oriented toward the rupture disc device inlet and exposed to the process media as indicated by arrow showing the flow path through the assembly, the pressure thereof generated radially directed outward forces on the weld joint creating the potential for failure of the seal provided thereby. However, with the radially inner weld joint 26 provided between the rupture disc 14 and the device body 12, any such radially outward directed forces on the weld joint 26 puts the weld joint 26 into a compressive state due to the material of the device body 12 radially outward therefrom, as will be described further hereinafter.

Referring to FIGS. 2-6, it can be seen that the preferred rupture disc device 10 has an annular configuration such that the body outer surface 24 has a circular cross-sectional shape and the device body 12 has a linear throughbore 42 extending therethrough. The device body 12 is preferably a two-piece device body 12 including an annular retaining ring member 28 and an annular main body seat member 30 that are welded together to form the linear throughbore 42 extending therethrough. The main seat member 30 has a recessed seating area 32 in which the rupture disc 14 and the retaining ring member 28 are received. More specifically, the main seat member 30 has an annular body portion 34 and an upstanding, axially extending outer annular wall portion 36 with an annular shoulder surface 38 formed therebetween. The shoulder surface 38 has a recessed annular pocket 39 formed therein having an axial step surface 40 extending therearound.

Figure 5:
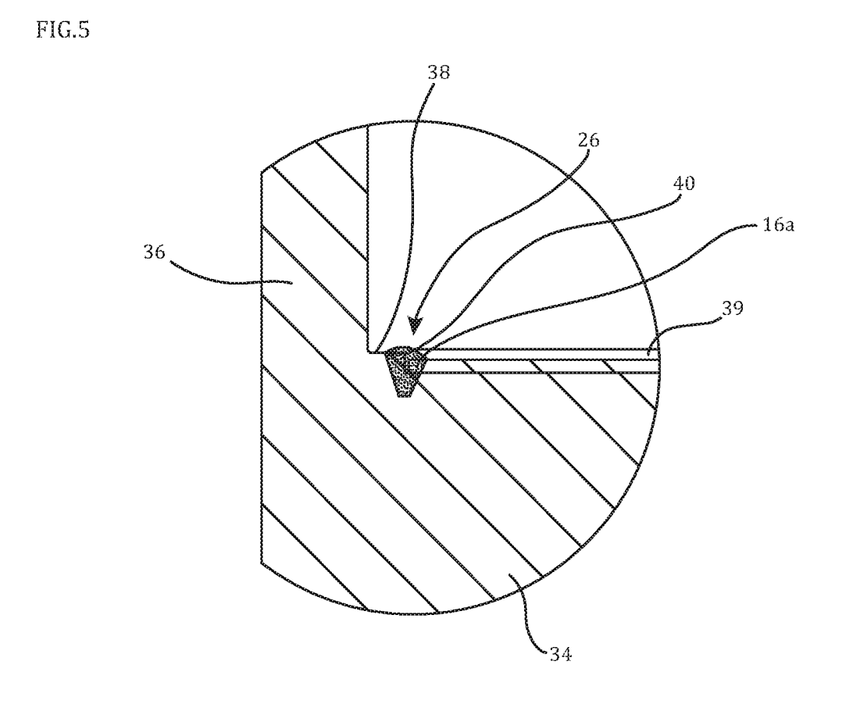
FIG. 5 is an enlarged cross-sectional view of the weld joint between the seat member and the rupture disc shown in FIG. 4.

The flat, outer ring portion 16 of the rupture disc 14 is located in the pocket 39 to be welded to the seat member 30 at the circular outer periphery 16a of the ring portion 16 so that the ring portion 16 at the outer periphery 16a thereof is fused to the material of the main seat member 30 along the shoulder surface 38, recessed pocket 39 and the axial step surface 40 thereof to form the weld joint 26 therebetween. Because the pocket 39 is radially inward from the upstanding annular wall portion 36, radial clearance is provided for the axial weld beam for forming a weld joint between the rupture disc 16 and the seat member 30 as well as for providing more metallic material to overlay the welded disc ring portion periphery 16a, as shown in FIG. 5. Various welding techniques may be utilized with electron beam welding being one preferred technique used for forming the weld joints described herein. The materials of the device body 12 including the retaining ring member 28 and seat member 30 and the rupture disc 14 are preferably metallic materials, such as steel and steel alloy materials. For example, the rupture disc material can include 316/316L, C-276, Hastellloy, Monel, Nickel 400, Nickel 600, Nickel 625, Inconel 600, Inconel 625, Nickel 200/201, Titanium, Tantalum, A-36, and 1018. The metallic material of the rupture disc 14, retainer ring member 28 and seat member 30 can be the same or different from each other.

To weld the outer periphery 16a of the rupture disc ring portion 16 in the recessed pocket 39, the weld beam is directed in a generally axial direction along axis 41. As shown, axis 41 extends generally through the central throughbore 42 of the rupture disc device 10. Because the heat generated by the welding process is directed in a transverse and, more specifically, perpendicular direction to the thickness of the outer ring portion 16 between the upper and lower surfaces 44 and 46 thereof, heat energy conducted radially inward to the dome wall portion 18 of the rupture disc 14 is kept to a minimum. In this manner, generating the weld joint 26 as described does not also create unwanted variances in the desired burst pressure of the rupture disc 14. This is particularly true with thinner rupture discs 14 such as on the order of approximately 0.001 inches to 0.037 inches in thickness. Such thinner rupture discs 14 are more sensitive to the effects of heat on the metallurgical properties of the disc 14, and particularly the frangible dome wall portion 18 thereof.

Figure 3:
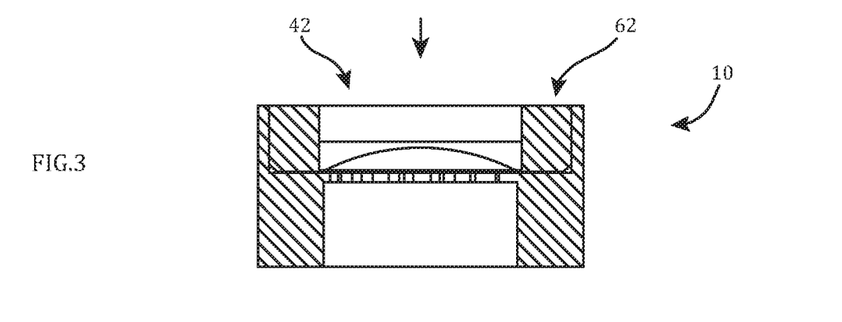
FIG. 3 is a cross-sectional view taken along line 3-3 of FIG. 2.
Figure 4:
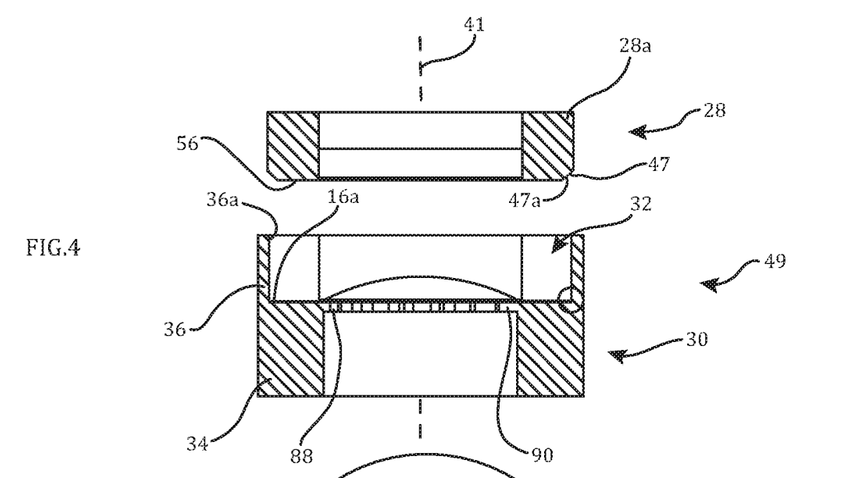
FIG. 4 is an exploded, cross-sectional view of the rupture disc device showing a retaining ring member, and a subassembly of a main seat member having the rupture disc welded thereto.
Figure 6:
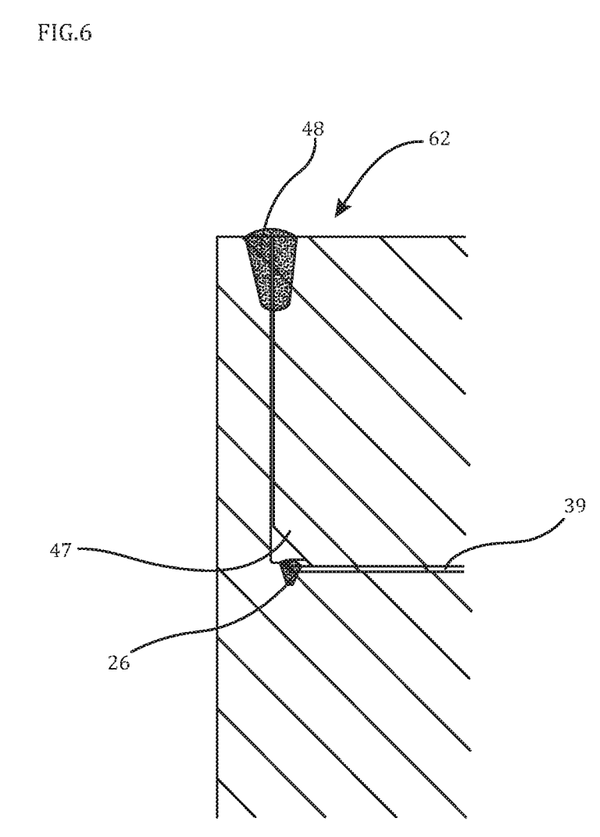
FIG. 6 is an enlarged cross-sectional view showing the retaining ring member welded to an upstanding annular wall portion of the seat member.

After welding of the rupture disc 14 to the seat member 30 to form subassembly 49, the assembly of the rupture disc device 10 proceeds by welding the retaining ring member 28 to the subassembly 49 so that the retaining ring member 28 is disposed and secured in the recessed seating area 32 of the seat member 30. The retainer ring member 28 has an outer diameter that is in clearance with the diameter across the recessed seating area 32 formed by the upstanding annular wall portion 36 as to be able to fit within the recessed seating area 32, as shown in FIGS. 1 and 3. Along its lower outer corner 47 the ring member 28 is chamfered so that when fit within the seating area 32, the ring member 28 does not engage and place loading directly on the welded joint 26 between the disc ring portion 16 and the seat member 30, as can be seen in FIG. 6. As shown, the corner 47 has an obliquely extending surface 47a due to the chamfer thereof.

The retaining ring member 28 is welded to the seat member 30 at the upper outer corner 28a of the ring member 28 and the upper inner end 36a of the upstanding wall portion 36 to form weld joint 48 therebetween, as shown in FIG. 1. The weld joint 48 is axially spaced from the weld joint 26 and slightly radially misaligned or offset from the weld joint 26 so that it is radially outward therefrom. Comparing FIG. 1 to FIG. 10, it can be seen that the present rupture disc device 10 has multiple weld joints 26 and 48 versus the single weld joint of the prior disc assembly. This is advantageous in that the weld joint 26 need only be formed to fuse two components together, namely the rupture disc 14 and the seat member 30, to provide a sealed connection therebetween without the need for the weld joint 26 to also provide structural support against the loading experienced by the rupture disc device 10 during its installation and when it is in service. This enables a lower weld depth for weld joint 26 to be utilized while still achieving a proper seal between the rupture disc 14 and the seat member 30. By contrast, the second weld joint 48 is considered a structural weld to keep the body members 28 and 30 securely connected, and thus is preferably formed to be larger and deeper than weld joint 26, as depicted in FIG. 6. In this regard, since the weld joint 26 need not be as robust as either the weld joint 48 or the weld joint for the prior disc assembly of FIG. 7, the heat energy generated during the welding thereof can be lower and thus less impactful on the intended burst pressures of the rupture disc 14, particularly with thinner rupture discs 14 as previously discussed.

Figure 7:
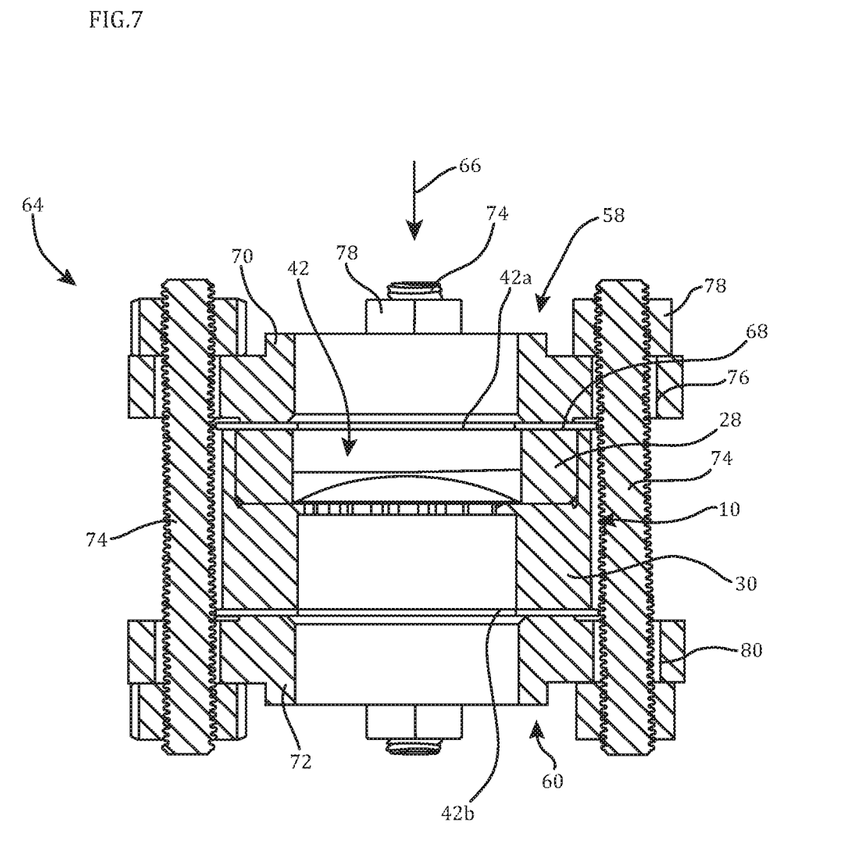
FIG. 7 is a cross-sectional view of the rupture disc device clamped in a reverse-acting orientation between inlet and outlet flanged members.

With the rupture disc device 10, all potential pathways for leakage are formed entirely radially inward of outer surface 50 of the device body 12. In this manner, any leakage pathways are all contained within the device body 12, so that they are not exposed to the exterior thereof along the radially outer surface 50 of the device body 12. In particular, the leakage pathway of device body 12 includes transversely extending sections with a radial pathway section 52 and an axial pathway section 54. The radial pathway section 52 is along the rupture disc ring portion 16 between bottom surface 56 of the retaining ring member 28 and recessed pocket 39 of the seat member 30. The radial pathway section 52 is sealed by the weld joint 26. Also, when installed as shown in FIG. 7, the clamping pressure exerted by the clamped flanged members 58 and 60 such as flanged pipes will seal the retaining ring member 28 against the facing surface 44 of the disc outer ring portion 16 since the retaining ring member 28 is oriented such that its bottom surface 56 is in recessed pocket 39 engaged with the disc ring portion surface 44. In addition, even if there is leakage along the radial pathway section 52 such as due to an imperfect weld joint 26, the process media will not escape to the surrounding work areas since neither the radial pathway section 52 nor the axial pathway section 54 are exposed to the outer surface 50 of the device body 12. Any leakage of the media through the radial pathway section 52 and past the seal formed by the weld joint 26 will still be blocked from leakage to the outer surface 50 by the weld joint 48 at the end of the axial pathway section 54. Thus, the leakage pathway for the rupture disc device 10 is a non-linear or tortuous pathway including transverse sections 52 and 54 thereof further minimizing potential leaks therefrom.

Once the rupture disc device 10 is welded together as described above, the weld 48 and the annular axial end surface 62 of the device body 12 are machined to a desired surface finish for providing a uniform seal surface for installation of the device 10. More specifically and referring to FIG. 7, the rupture disc device 10 is shown installed in its reverse-acting orientation with flow through the bolted flanged assembly 64 indicated by arrow 66 such that the frangible dome wall portion 18 has its convex side or surface 20 facing inlet 42a of the device linear throughbore 42 formed by the retaining ring member 28 and its concave side or surface 22 facing outlet 42b of the device linear throughbore 42 formed by the main seat member 30. For installation a ring gasket member 68 is placed on the machined axial end surface 62 so as to seat flush thereon. Thereafter, annular flanges 70 and 72 are aligned adjacent corresponding device members 28 and 30 and threaded studs 74 are inserted through aligned stud apertures 76 of the flanges 70 and 72 with nuts 78 threaded onto the projecting ends of the studs 76 so as to clamp the flange members 70 and 72 against corresponding axial ends of the rupture disc device 10. The gasket member 68 being tightly clamped by flange 70 against the axial end surface 62 including the weld joint 48 thereat will act to further seal the rupture disc device 10 even if both of the weld joints 26 and 48 experience leakage therearound.

With the rupture disc device 10 in service as illustrated in FIG. 7, the forces acting on the rupture disc 14 aid in the sealing function provided by the weld joint 26 as the convex side 20 of the frangible dome wall portion 18 is exposed to the pressure of the process media. As previously discussed, this creates a radial outwardly directed force in the ring portion 16 of the rupture disc 14 which urges the weld joint 26 more firmly against the axial step surface 40 in the pocket 39 improving the sealing provided thereby. And as previously mentioned, the weld joint 26 does not experience any other loading as the retaining ring member 28 has a corner chamfer 47 to extend obliquely to the retaining member bottom surface 56 providing clearance for the weld joint 26 so as to remove any direct loading thereon from the clamping force generated by the bolted flange assembly 64. As can be seen in FIG. 6, the retaining ring member 28 can be sized to extend into the pocket 39, albeit in clearance with the weld joint 26 extending along the pocket axial step surface 40 due to the chamfered corner 47 of the retaining ring member 28.

Figure 8:
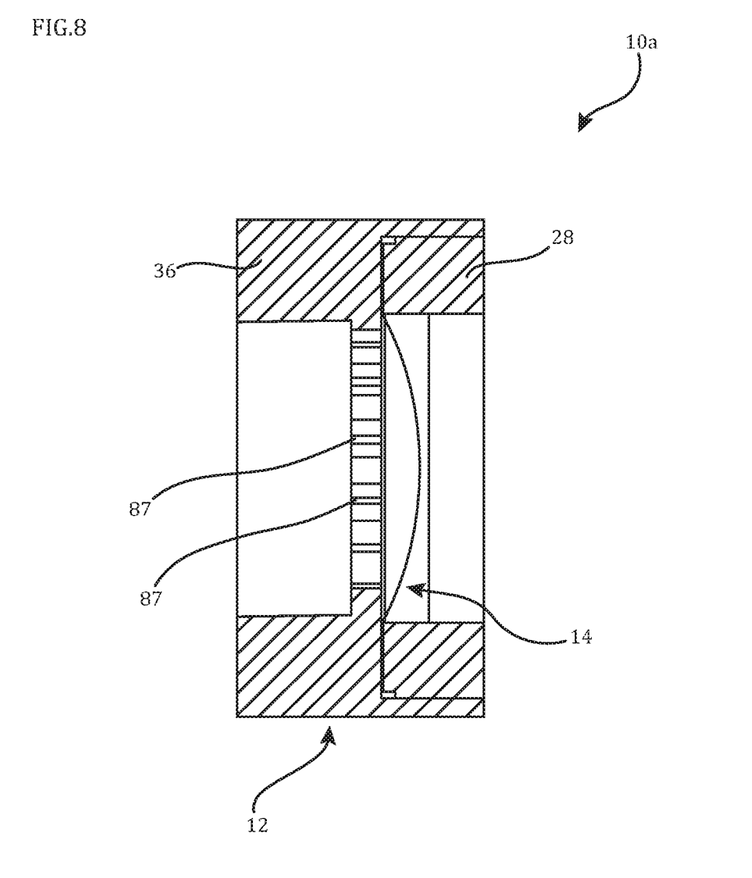
FIG. 8 is an enlarged cross-sectional view of an alternative rupture disc device showing a rupture disc welded to a device body.
Figure 9:
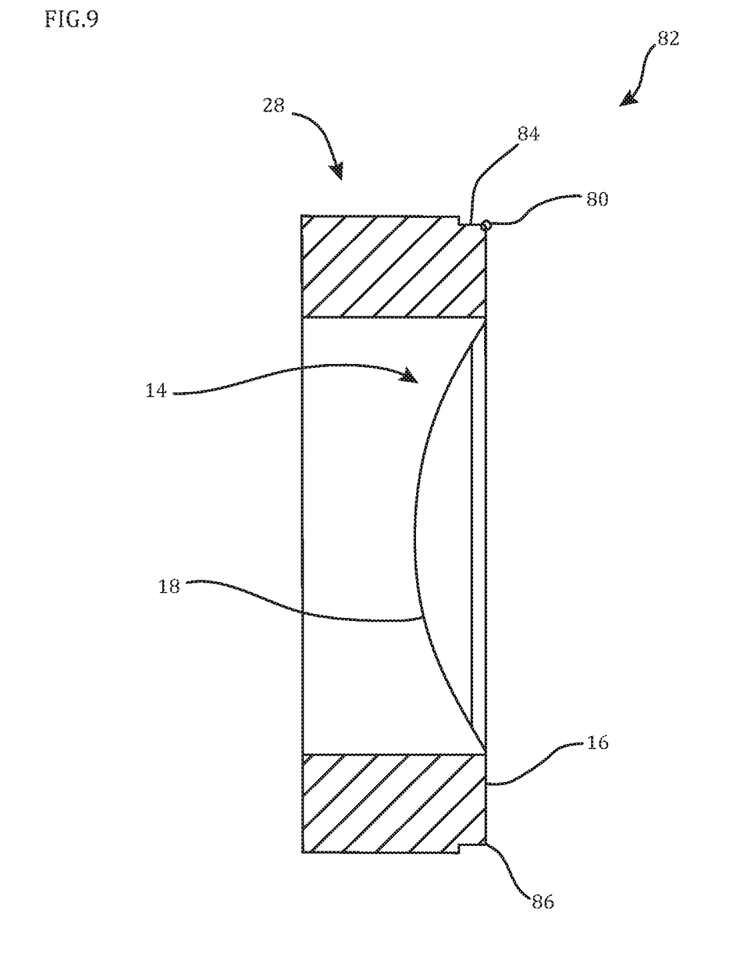
FIG. 9 is a cross-sectional cross-sectional view of a subassembly of the rupture disc device of FIG. 8 showing the rupture disc welded to the retaining ring member.

In another embodiment, rupture disc device 10a as shown in FIG. 8 is provided which is similar to the previously-described rupture disc device 10 such that the same reference numbers will be used for their corresponding components. The rupture disc device 10a also preferably has a two-piece device body 12 having the rupture disc 14 welded thereto. However, the rupture disc 14 is welded to the retaining ring member 28, as opposed to the seat member 30. As shown in FIG. 9, the rupture disc 14 is fitted directly to the retaining ring member 28 with their respective outer diameters aligned, and the rupture disc ring portion 16 seated flush against ring member bottom 56 for forming a peripheral edge joint type weld 80 (illustrated schematically) that seals the rupture disc 14 and the retaining ring member 28 together and forms subassembly 82.

In this regard, the ring member 28 of the rupture disc device 10a does not include a chamfered outer, lower corner like the previously described ring member 28 of the rupture disc device 10, but instead has an annular groove 84 formed at the outer, lower corner 86 with the corner 86 having substantially the same diameter as the outer periphery 16a of the rupture disc ring portion 16. The rupture disc device 10a avoids creating undesired variances in the burst pressure of the rupture disc 14 when using radially directed heat energy for forming the peripheral weld 80 because of the easy capability to tightly line-up the outer periphery of the rupture disc 14 and the ring member 28 during welding. This results in being able to form the peripheral weld joint 80 to have effective sealing capabilities while at the same time requiring lower amperage (i.e., reduced heat) for its formation. Given that lower burst pressures, e.g., approximately 50 psi and below, require thinner rupture discs, which are more easily stressed, the lower amperage needed for the peripheral weld 80 reduces potential defects of the rupture disc 14. The ease of use of the fixturing for forming the welded subassembly 82 also allows for fast and efficient manufacturing of the rupture disc device 10a.

Furthermore, each of the weld joints 48 and 80 in the rupture disc device 10a remain disposed radially inward from the outer surface 50 of the device body 12, and specifically the radially larger seat member 30 thereof such that the rupture disc device 10a generally has the same transversely extending leakage pathway sections 52 and 54 as the previously described rupture disc device 10. Therefore, any defects due to stress pressure on the peripheral weld 80 that may result in leakage will still be contained by the weld joint 48 between the retaining ring member 28 and the seat member 30.

To complete the rupture disc device 10a, the subassembly 82 is secured to the seat member 30 by creating the weld joint 48 between the upper corner 28a of the ring member 28 having the rupture disc 14 already welded thereto and the upper, inner end 36a of the upstanding wall portion 36 of the seat member 30. The rupture disc device 10a can then be clamped in a reverse-acting orientation between inlet and outlet flanged members 58 and 60 in the same manner as shown in FIG. 7.

Figure 2:
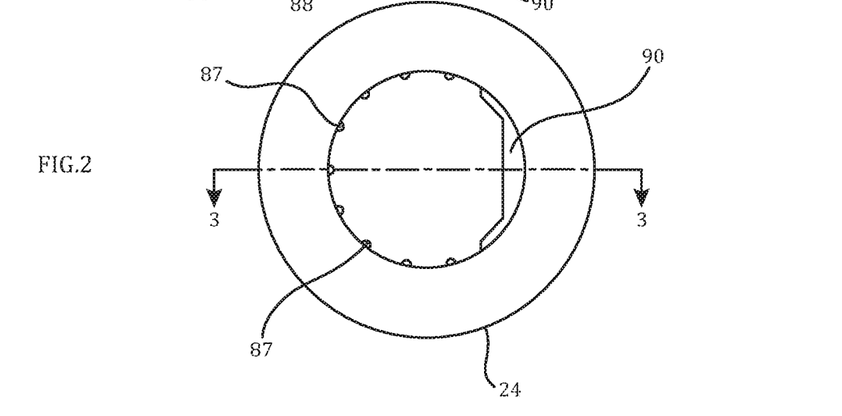
FIG. 2 is a plan view of the rupture disc device showing the annular configuration of the device body thereof.

In both rupture disc devices 10 and 10a, the seat member 30 can have cutting elements 87 formed to be spaced circumferentially about the upper, inner edge portion 88 of the annular body portion 34 thereof. The cutting elements 87 assist with the rupture of dome wall portion 18 of the rupture disc 14 when the process media in the device body 12 reaches the predetermined burst pressure of the rupture disc 14. As best seen in FIG. 2, a segment shaped portion 90 projects from the edge portion 88 and provides a fulcrum about which the burst dome wall portion 18 bends when it is ruptured so that the dome wall portion 18 stays attached to the outer ring portion 16 after it is burst and bent.

Those skilled in the art and will recognize that a wide variety of modifications, alterations, and combinations can be made with respect to the above described embodiments without departing from the spirit and scope of the invention, and that such modifications, alterations, and combinations, are to be viewed as being within the scope of the invention.

What is claimed is:

1. A pressure relief device comprising:
    a device body having an inlet and an outlet, an outer surface, and a linearly extending throughbore having opposite ends at which the inlet and outlet are disposed;
    a rupture disc having a frangible dome wall portion and a periphery; and
    a weld joint between the periphery of the rupture disc and the device body spaced inwardly of the outer surface of the device body such that the frangible dome wall portion is oriented to block flow through the linearly extending throughbore of the device body,
    wherein the device body has an annular configuration including a seat member with a recessed seat portion having an upstanding annular wall portion extending therearound, and a retaining ring member configured to be received by the recessed seat portion of the seat member such that a portion of the rupture disc is disposed between the seat member and the retaining ring member,
    and the weld joint between the rupture disc periphery and the device body is spaced radially inwardly from the upstanding annular wall portion.

2. The pressure relief device of claim 1, wherein the rupture disc has a reverse acting configuration so that a convex surface of the frangible dome wall portion is oriented toward the inlet.

3. The pressure relief device of claim 1, wherein the device body has a two-piece construction with one of the seat member and the retaining ring member of the device body having the weld joint with the rupture disc to form a subassembly, and another weld joint formed between the one member of the subassembly and another member of the device body.

4. The pressure relief device of claim 3, wherein the weld joint between the device body members being a structural weld joint that is larger than the weld joint between the rupture disc and the one member of the device body.

5. The pressure relief device of claim 3, wherein the weld joints block a tortuous leakage pathway from the throughbore to the device body outlet including a radial section along the rupture disc to the weld joint thereof with the one member of the device body and an axial section between the weld joints.

6. The pressure relief device of claim 1, wherein the weld joint between the rupture disc periphery and the device body is-spaced radially inwardly from the upstanding annular wall portion provides for clearance for an axial weld beam for forming the weld joint.

7. The pressure relief device of claim 1, further comprising a second weld joint between the retaining ring member and the seat member.

8. The pressure relief device of claim 7, wherein the weld joint is between the rupture disc and the seat member.

9. The pressure relief device of claim 8, wherein a radially outer corner of the retaining ring member is chamfered so as to be adjacent to and spaced from the weld joint with the retaining ring member and the seat member welded together with the second weld joint.

10. The pressure relief device of claim 8, wherein the recessed seat portion includes an axially facing shoulder surface with a recessed annular pocket therein such that a step surface extends between the recessed annular pocket and an adjacent portion of the shoulder surface disposed radially outwardly of the recessed annular pocket, wherein the recessed annular pocket has a diameter sized to receive the rupture disc therein and the first weld is at least partially between the rupture disc and the step surface.

11. The pressure relief device of claim 7, wherein the weld joint is between the rupture disc and the retaining ring member.

12. The pressure relief device of claim 11, wherein the retaining ring member includes an annular groove at a radially outer corner thereof that is configured to align with a periphery of the rupture disc, the groove providing spacing for the weld joint from the seat member with the retaining ring member and the seat member welded together with the second weld joint.

13. The pressure relief device of claim 7, wherein the weld joints are radially offset and axially spaced from one another.

14. The pressure relief device of claim 1, wherein the rupture disc has a thickness between about 0.001 inches and about 0.037 inches.

15. The pressure relief device of claim 1, further comprising a bolted, flanged assembly, the bolted, flanged assembly mounting the pressure relief device in-line with a pressurized fluid delivery system.

16. A method for assembling a pressure relief device for relieving over-pressure conditions, the method comprising:
    seating a rupture disc having a frangible dome wall portion in a device body;
    welding a periphery of the rupture disc and the device body together to form a weld joint therebetween such that the frangible dome wall portion of the rupture disc blocks flow through a linearly extending throughbore of the device body with the weld joint being spaced radially inwardly of an outer surface of the device body; and
    disposing a retaining ring member of the device body in a recessed seat portion of a seat member of the device body with a portion of the rupture disc captured between the retaining ring member and the seat member;
    wherein the recessed seat portion of the seat member includes an upstanding annular wall portion extending therearound and the periphery of the rupture disc is spaced radially inward of the upstanding annular wall portion to provide clearance therefrom so that the weld joint between the periphery of the rupture disc and the device body is spaced radially inward from the upstanding annular wall portion.

17. The method of claim 16, wherein seating the rupture disc in the device body comprises seating the rupture disc within the device body so that a convex surface of the frangible dome wall portion is oriented toward an inlet of the device body and material of the device body is adjacent to and radially outward of the weld joint.

18. The method of claim 16, wherein the device body has a two-piece construction, welding the periphery of the rupture disc and the device body includes forming a subassembly with one of the retaining ring member and the seat member of the device body; and further comprising welding the one member of the device body and another member of the device body together to form another weld joint therebetween.

19. The method of claim 18, wherein welding the members of the device body together comprises welding the members of the device body together to form a structural weld joint therebetween which is larger than the weld joint between the rupture disc and the one member of the device body.

20. The method of claim 16, further comprising:
    welding the retaining ring member and the seat member together to form a second weld joint therebetween.

21. The method of claim 20, wherein welding the periphery of the rupture disc and the device body together to form the weld joint therebetween comprises welding the periphery of the rupture disc and the seat member together to form the weld joint therebetween.

22. The method of claim 21, wherein welding the rupture disc periphery and the seat member together comprises seating the rupture disc in an annular pocket of the recessed seat portion of the seat member, the annular pocket being recessed with respect to a radially outward shoulder surface of the recessed seat portion; and welding the periphery of the rupture disc and a step surface extending between the annular pocket and the radially outward shoulder surface of the recessed seat portion together to form the weld joint therebetween.

23. The method of claim 21, wherein welding the periphery of the rupture disc and the seat member together to form the weld joint therebetween comprises welding in a direction transverse to a wall thickness of the rupture disc.

24. The method of claim 16, wherein welding the periphery of the rupture disc and the device body together to form the weld joint therebetween comprises welding the periphery of the rupture disc and the retaining ring member together to form the weld joint therebetween.

25. The method of claim 24, wherein welding the periphery of the rupture disc and the retaining ring member together comprises welding the periphery of the rupture disc and an inner surface of an annular groove at a radially outer corner of the retaining ring member together to form the weld joint therebetween.

\* \* \* \* \*